US012509481B2

(12) United States Patent
Oshiro et al.

(10) Patent No.: US 12,509,481 B2
(45) Date of Patent: Dec. 30, 2025

(54) GLYCOSIDE COMPOUND, AMIDITE COMPOUND, AND PRODUCTION METHOD FOR POLYNUCLEOTIDE USING SAID COMPOUNDS

(71) Applicant: SUMITOMO CHEMICAL COMPANY, LIMITED, Chuo-ku (JP)

(72) Inventors: Ikuya Oshiro, Osaka (JP); Tatsuya Saito, Osaka (JP); Hideki Ihara, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 883 days.

(21) Appl. No.: 17/770,520

(22) PCT Filed: Aug. 28, 2020

(86) PCT No.: PCT/JP2020/032593
§ 371 (c)(1),
(2) Date: Apr. 20, 2022

(87) PCT Pub. No.: WO2021/079617
PCT Pub. Date: Apr. 29, 2021

(65) Prior Publication Data
US 2023/0024003 A1    Jan. 26, 2023

(30) Foreign Application Priority Data

Oct. 23, 2019  (JP) .................... 2019-192899

(51) Int. Cl.
| | | |
|---|---|---|
| *C07H 1/00* | (2006.01) | |
| *C07C 315/04* | (2006.01) | |
| *C07C 317/18* | (2006.01) | |
| *C07H 19/06* | (2006.01) | |
| *C07H 21/00* | (2006.01) | |

(52) U.S. Cl.
CPC ............. *C07H 1/00* (2013.01); *C07C 315/04* (2013.01); *C07C 317/18* (2013.01); *C07H 19/06* (2013.01); *C07H 21/00* (2013.01)

(58) Field of Classification Search
None
See application file for complete search history.

(56) References Cited

U.S. PATENT DOCUMENTS

| 10,377,788 B2 * | 8/2019 | Aoki ................... C07H 19/167 |
|---|---|---|
| 2007/0282097 A1 | 12/2007 | Ohgi et al. |
| 2014/0206856 A1 | 7/2014 | Aoki et al. |
| 2018/0079768 A1 | 3/2018 | Aoki et al. |
| 2021/0238217 A1 | 8/2021 | Tanaka et al. |

FOREIGN PATENT DOCUMENTS

| CN | 107428793 A | 12/2017 |
|---|---|---|
| CN | 110198948 A | 9/2019 |
| JP | 5157168 B2 | 3/2013 |
| JP | 5554881 B2 | 7/2014 |
| WO | WO 2007/064291 A1 | 6/2007 |
| WO | WO 2013/027843 A1 | 2/2013 |
| WO | WO 2016/159374 A1 | 10/2016 |
| WO | WO 2019/208571 A1 | 10/2019 |

OTHER PUBLICATIONS

International Search Report & Written Opinion issued Oct. 20, 2020 in PCT/JP2020/032593 filed on Aug. 28, 2020, 5 pages.
Ali et al., "The methylsulfonylethoxymethyl (Msem) as a hydroxyl protecting group in oligosaccharide synthesis", Tetrahedron, vol. 66, 2010, pp. 6121-6132.
Search Report issued Jun. 6, 2024, in corresponding Chinese Patent Application No. 202080073849.5 (with English Translation of Category of Cited Documents), 2 pages.

* cited by examiner

*Primary Examiner* — Patrick T Lewis
(74) *Attorney, Agent, or Firm* — Oblon, McClelland, Maier & Neustadt, L.L.P.

(57) ABSTRACT

The present invention provides an amidite compound capable of improving a yield and a purity of a polyoligonucleotide, a glycoside compound as an intermediate thereof, and a production method for a polynucleotide using the amidite compound. The present invention also provides an amidite compound of formula (1) capable of improving a yield and a purity of a polyoligonucleotide, a glycoside compound of formula (10) (in formulae (10) and (1), $B^a$, $R^a$, $R^b$, $R^c$, $G^1$, $G^2$, and $G^3$ are as defined in the description, and R is represented by the following formulae), and a production method for a polynucleotide using the amidite compound.

21 Claims, No Drawings
Specification includes a Sequence Listing.

GLYCOSIDE COMPOUND, AMIDITE COMPOUND, AND PRODUCTION METHOD FOR POLYNUCLEOTIDE USING SAID COMPOUNDS

CROSS-REFERENCE TO RELATED APPLICATIONS

The present application is a 35 U.S.C. § 371 national stage patent application of International patent application PCT/JP2020/032593, filed on Aug. 28, 2020, which is based on and claims the benefits of priority to Japanese Application No. 2019-192899, filed on Oct. 23, 2019. The entire contents of these applications are incorporated herein by reference.

TECHNICAL FIELD

This patent application claims priority to and the benefit of Japanese Patent Application No. 2019-192899 filed on Oct. 23, 2019 according to the Paris Convention, the entire contents of which are incorporated herein by reference.

The present invention relates to a glycoside compound, an amidite compound thereof, and a production method for a polynucleotide using the compounds. The present invention further relates to an intermediate compound of the glycoside compound and a production method for the intermediate compound.

BACKGROUND ART

RNA can be used as an RNA probe, an antisense RNA, a ribozyme, an siRNA, an aptamer, or the like, and is a useful material.

RNA can be synthesized by the solid-phase synthesis or the like, and in the solid-phase synthesis, phosphoramidite of nucleoside (hereinafter referred to as "amidite") is used as a raw material. Examples of a protecting group of a hydroxyl group at the 2' position of the amidite include t-butyldimethylsilyl (TBDMS), triisopropylsilyloxymethyl (TOM), bis(2-acetoxyethoxy)methyl (ACE), and others. Further, although the protecting groups of the hydroxyl group at the 2' position of the amidite which are disclosed in Patent Documents 1 to 4 have been reported, a yield or a purity of RNA obtained through a synthesis method of RNA using an amidite containing these protecting groups may be unsatisfactory.

PRIOR ART DOCUMENTS

Patent Documents

Patent Document 1: JP 5157168 B2
Patent Document 2: JP 5554881 B2
Patent Document 3: WO 2007/064291 A
Patent Document 4: WO 2013/027843 A

SUMMARY OF THE INVENTION

Problems to be Solved by the Invention

An object of the present invention is to provide an amidite compound capable of improving a yield and a purity of a polynucleotide, and a production method for a polynucleotide using the amidite compound. Further, an object of the present invention is to provide a glycoside compound as an intermediate of the amidite compound, and a production method for an intermediate ether compound of the glycoside compound.

Means for Solving the Problems

The present inventors have intensively studied to achieve the objects, and as a result, found that use of the following group as a protecting group of a hydroxyl group at the 2' position of an amidite could lead to synthesis of RNA with high purity:

[Chemical formula 1]

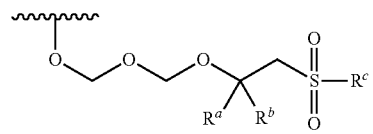

wherein:
$R^a$ and $R^b$ are identical to or different from each other and each represents a methyl group, an ethyl group, or a hydrogen atom, provided that $R^a$ and $R^b$ do not represent a hydrogen atom at the same time; and
$R^c$ represents a phenyl group which may be substituted with a halogen atom, a methyl group, a nitro group, a methoxy group, or a trifluoromethyl group; a C1 to C10 alkyl group; or a benzyl group.

The present invention has been completed after further examinations on the basis of these findings, and provides the following glycoside compound, an amidite compound thereof, a production method for a polynucleotide using the amidite compound, an ether compound as an intermediate of the glycoside compound, and a production method for the ether compound.

The present invention includes embodiments described in the following items, but is not limited thereto.

Item 1. An amidite compound represented by formula (1) (hereinafter referred to as "amidite compound of the present invention"):

[Chemical formula 2]

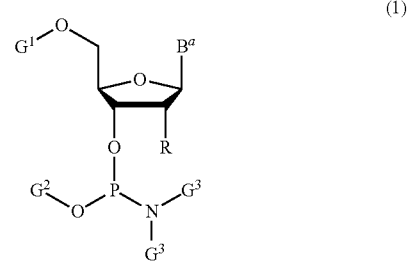

wherein R represents a group represented by a formula:

[Chemical formula 3]

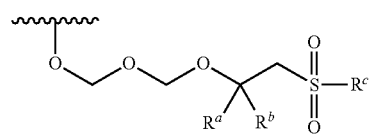

wherein:

$R^a$ and $R^b$ are identical to or different from each other and each represents a methyl group, an ethyl group, or a hydrogen atom, provided that $R^a$ and $R^b$ do not represent a hydrogen atom at the same time; and $R^c$ represents a phenyl group which may be substituted with a halogen atom, a methyl group, a nitro group, a methoxy group, or a trifluoromethyl group; a C1 to C10 alkyl group; or a benzyl group, $B^a$ represents a group having an optionally-protected nucleobase structure, $G^1$ and $G^2$ are identical to or different from each other and each represents a protecting group of a hydroxyl group, and $G^3$ is identical to or different from each other and each represents an alkyl group.

Item 2. The amidite compound according to Item 1, wherein $R^a$ represents a methyl group, and $R^b$ represents a hydrogen atom.

Item 3. The amidite compound according to Item 1, wherein $R^a$ and $R^b$ both represent a methyl group.

Item 4. The amidite compound according to any one of Items 1 to 3, wherein $G^1$ represents the following group:

[Chemical formula 4]

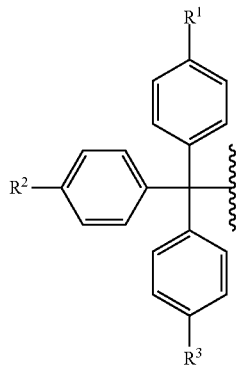

wherein $R^1$, $R^2$, and $R^3$ are identical to or different from each other and each represents hydrogen or an alkoxy group.

Item 5. The amidite compound according to any one of Items 1 to 4, wherein $G^2$ represents the following group.

[Chemical formula 5]

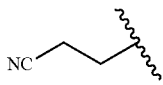

Item 6. The amidite compound according to any one of Items 1 to 5, wherein $G^3$ represents an isopropyl group.

Item 7. The amidite compound according to any one of Items 1 to 6, wherein $R^c$ represents a phenyl group or a tolyl group.

Item 8. A production method for a compound containing a polynucleotide structure represented by formula (2), the method including a step of using the amidite compound according to any one of Items 1 to 7 for a solid-phase synthesis reaction:

[Chemical formula 6]

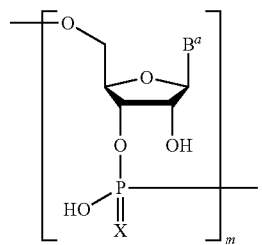

(2)

wherein $B^a$ is identical to or different from each other and each represents a group having an optionally-protected nucleobase structure, X represents an oxygen atom or a sulfur atom, and m represents a positive integer.

Item 9. The production method according to Item 8, wherein the compound containing a polynucleotide structure of formula (2) is a compound formed in a step of reacting a compound having an oligonucleotide structure represented by formula (3), formed in the solid-phase synthesis reaction using the amidite compound, with a tetraalkylammonium fluoride:

[Chemical formula 7]

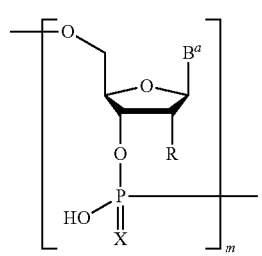

(3)

wherein $B^a$ is identical to or different from each other and each represents a group having an optionally-protected nucleobase structure, X represents an oxygen atom or a sulfur atom, and R is identical to or different from each other and each represents a group represented by a formula:

[Chemical formula 8]

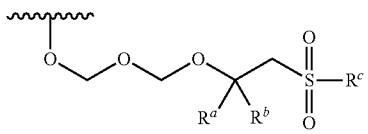

wherein:

$R^a$ and $R^b$ are identical to or different from each other and each represents a methyl group, an ethyl group, or a hydrogen atom, provided that $R^a$ and $R^b$ do not represent a hydrogen atom at the same time; and $R^c$ represents a phenyl group which may be substituted with a halogen atom, a methyl group, a nitro group, a methoxy group, or a trifluoromethyl group; a C1 to C10 alkyl group; or a benzyl group.

Item 10. The production method according to Item 9, wherein $R^a$ represents a methyl group, and $R^b$ represents a hydrogen atom.

Item 11. An ether compound represented by formula (4):

[Chemical formula 9]

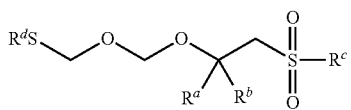

(4)

wherein:
$R^a$ and $R^b$ are identical to or different from each other and each represents a methyl group, an ethyl group, or a hydrogen atom, provided that $R^a$ and $R^b$ do not represent a hydrogen atom at the same time;
$R^c$ represents a phenyl group, a C1 to C10 alkyl group, or a benzyl group which may be substituted with a halogen atom, a methyl group, a nitro group, a methoxy group, or a trifluoromethyl group; a C1 to C10 alkyl group; or a benzyl group; and $R^d$ represents C1 to C10 alkyl or a phenyl group.

Item 12. The ether compound according to Item 11, wherein $R^a$ represents a methyl group, $R^b$ represents a hydrogen atom, and $R^c$ represents a phenyl group or a tolyl group.

Item 13. A production method for an ether compound represented by formula (4), the method including step a of reacting a 2-hydroxyalkylsulfone represented by a formula with a bisthioether compound represented by formula (12) in a solvent in presence of a halogenating agent and an acid:

[Chemical formula 10]

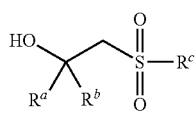

(5)

wherein:
$R^a$ and $R^b$ are identical to or different from each other and each represents a methyl group, an ethyl group, or a hydrogen atom, provided that $R^a$ and $R^b$ do not represent a hydrogen atom at the same time; and
$R^c$ represents a phenyl group which may be substituted with a halogen atom, a methyl group, a nitro group, a methoxy group, or a trifluoromethyl group; a C1 to C10 alkyl group; or a benzyl group.

[Chemical formula 11]

(12)

wherein $R^d$ is as defined in Item 11,

[Chemical formula 12]

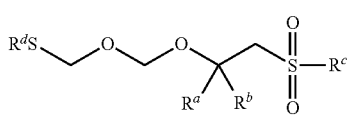

(4)

wherein $R^a$, $R^b$, $R^c$, and $R^d$ are as defined above.

Item 14. The production method according to Item 13, wherein $R^a$ represents a methyl group or an ethyl group, $R^b$ represents a hydrogen atom, and $R^c$ represents a phenyl group or a tolyl group.

Item 15. The production method according to Item 13, wherein $R^a$ represents a methyl group, $R^b$ represents a hydrogen atom, and $R^c$ represents a phenyl group or a tolyl group.

Item 16. A production method for a compound represented by formula (8), the method including reacting a compound represented by formula (7) with a compound represented by formula (4) in presence of a halogenating agent:

[Chemical formula 13]

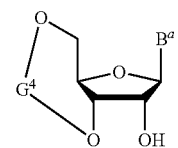

(7)

wherein $B^a$ represents a compound having an optionally-protected nucleobase structure, and $G^4$ represents a protecting group of a hydroxyl group,

[Chemical formula 14]

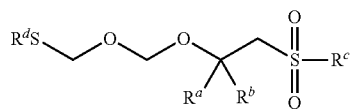

(4)

wherein $R^a$, $R^b$, $R^c$, and $R^d$ are as defined in Item 11,

[Chemical formula 15]

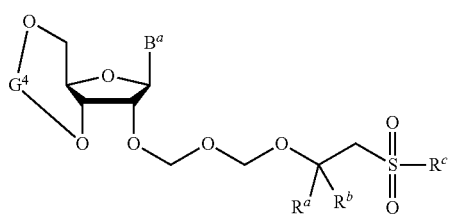

(8)

wherein $B^a$, $R^a$, $R^b$, and $R^c$ are as defined above, and $G^4$ represents a protecting group of a hydroxyl group.

Item 17. A production method for the compound of formula (1) according to Item 1, the method including the steps of:
further deprotecting the compound of formula (8) to obtain a compound represented by formula (9);
selectively protecting a hydroxyl group at the 5' position of the compound of formula (9) to obtain a compound represented by formula (10); and
reacting the compound of formula (10) with a phosphor-diamidite represented by formula (11):

[Chemical formula 16]

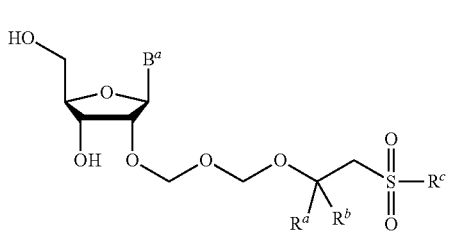
(9)

wherein $B^a$, $R^a$, $R^b$, and $R^c$ are as defined in Item 16,

[Chemical formula 17]

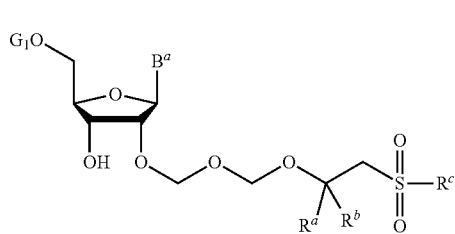
(10)

wherein $B^a$, $R^a$, $R^b$, $R^c$, and $G^1$ are as defined in Item 17,

[Chemical formula 18]

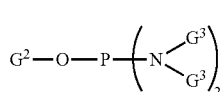
(11)

wherein $G^2$ represents a protecting group of a hydroxyl group, and $G^3$ is identical to or different from each other and each represents an alkyl group.

Item 18. The production method according to Item 17, wherein $G^4$ has a G4-1 or G4-2 structure.

[Chemical formula 19]

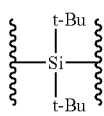
(G4-1)

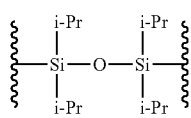
(G4-2)

Item 19. A compound represented by formula (8):

[Chemical formula 20]

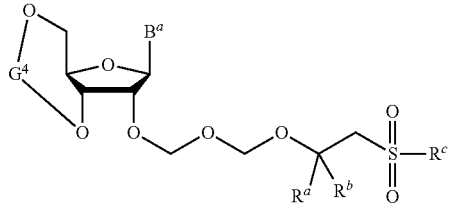
(8)

wherein $B^a$, $R^a$, $R^b$, $R^c$, and $G^4$ are as defined in Item 16.

Item 20. A compound represented by formula (9):

[Chemical formula 21]

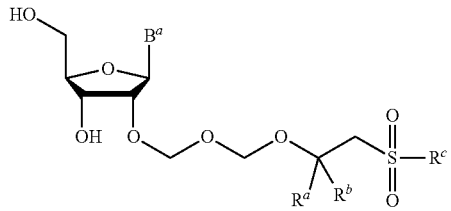
(9)

wherein $B^a$, $R^a$, $R^b$, and $R^c$ are as defined in Item 16,

Item 21. A compound represented by formula (10) (hereinafter referred to as "glycoside compound of the present invention"):

[Chemical formula 22]

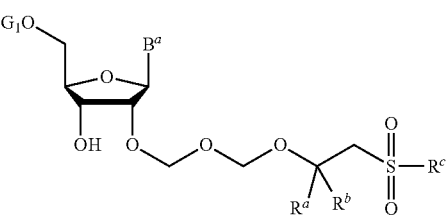
(10)

wherein $B^a$, $R^a$, $R^b$, $R^c$, and $G^1$ are as defined in Item 17,

Item 22. Use of the amidite compound of formula (1) in production of RNA.

Effect of the Invention

An amidite compound can be obtained by using a glycoside compound of the present invention, and as a result, it is possible to improve a yield and a purity of RNA in the solid-phase synthesis.

MODE FOR CARRYING OUT THE INVENTION

Hereinafter, the present invention will be explained in detail.

As used herein, the expression of "comprise" encompasses the meanings of "essentially consist of" and "consist of".

An amidite compound of the present invention is represented by formula (1):

[Chemical formula 23]

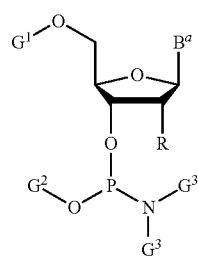

(1)

wherein R represents a formula:

[Chemical formula 24]

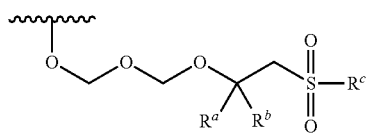

wherein:

$R^a$ and $R^b$ are identical to or different from each other and each represents a methyl group, an ethyl group, or a hydrogen atom, provided that $R^a$ and $R^b$ do not represent a hydrogen atom at the same time; and $R^c$ represents a phenyl group which may be substituted with a halogen atom, a methyl group, a nitro group, a methoxy group, or a trifluoromethyl group; a C1 to C10 alkyl group; or a benzyl group, $B^a$ represents a group having an optionally-protected nucleobase structure, $G^1$ and $G^2$ are identical to or different from each other and each represents a protecting group of a hydroxyl group, and $G^3$ is identical to or different from each other and each represents an alkyl group.

A nucleobase for $B^a$ is not particularly limited. Examples of the nucleobase include adenine, cytosine, guanine, uracil, thymine, 5-methylcytosine, pseudouracil, 1-methylpseudouracil, and others. Also, the nucleobase may be substituted with a substituent. Examples of the substituent include a halogen atom, an acyl group, an alkyl group, an arylalkyl group, an alkoxy group, an alkoxyalkyl group, a cyanoalkyl group, a hydroxy group, a hydroxymethyl group, an acyloxymethyl group, an amino group, a monoalkylamino group, a dialkylamino group, a carboxy group, a cyano group, a nitro group, and others as well as a combination of two or more of these substituents.

When the nucleobase contains an exocyclic amino group, a protecting group of the amino group is not particularly limited, and any publicly known protecting groups used in nucleic acid chemistry can be used. Examples of the protecting groups include a methyl group, a benzoyl group, a 4-methoxybenzoyl group, an acetyl group, a propionyl group, a butyryl group, an isobutyryl group, a phenylacetyl group, a phenoxyacetyl group, a 4-tert-butylphenoxyacetyl group, a 4-isopropylphenoxyacetyl group, a (dimethylamino)methylene group, and others as well as a combination of two or more of these protecting groups.

$B^a$ more specifically represents a group represented by any of the following formulae:

[Chemical Formula 25]

[Chemical formula 25]

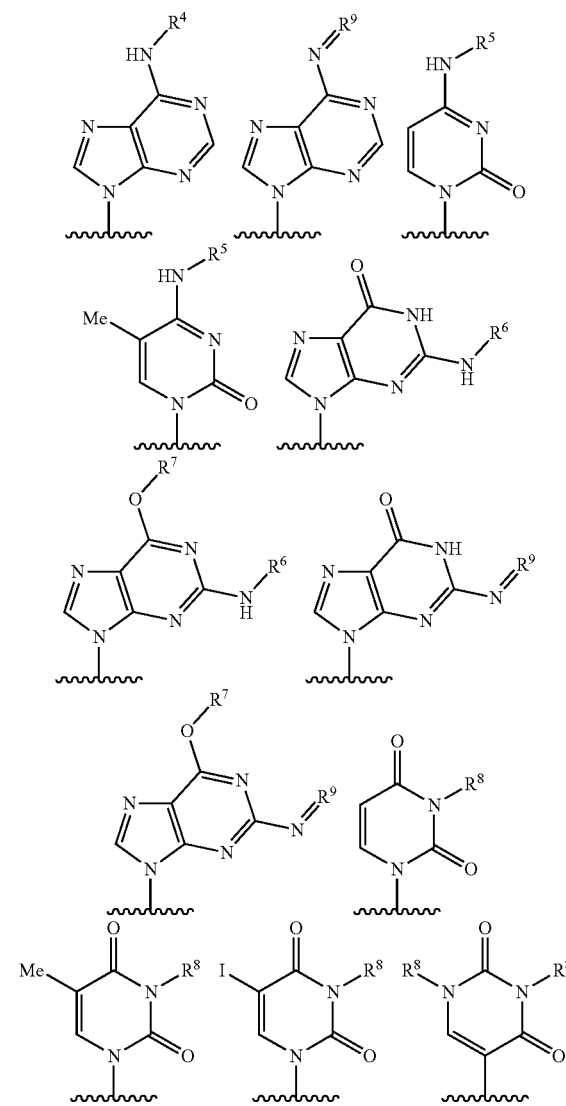

wherein:

$R^4$ represents a hydrogen atom, a methyl group, a phenoxyacetyl group, a 4-tert-butylphenoxyacetyl group, a 4-isopropylphenoxyacetyl group, a phenylacetyl group, an acetyl group, or a benzoyl group;

$R^5$ represents a hydrogen atom, an acetyl group, an isobutyryl group, or a benzoyl group;

$R^6$ represents a hydrogen atom, a phenoxyacetyl group, a 4-tert-butylphenoxyacetyl group, a 4-isopropylphenoxyacetyl group, a phenylacetyl group, an acetyl group, or an isobutyryl group;

$R^7$ represents a 2-cyanoethyl group;

$R^8$ represents a hydrogen atom, a methyl group, a benzoyl group, a 4-methoxybenzoyl group, or a 4-methylbenzoyl group; and $R^9$ represents a dimethylaminomethylene group.

Any groups can be used as $G^1$ without particular limitations when they may function as a protecting group, and publicly known protecting groups used for an amidite compound can widely be used.

$G^1$ is preferably the following group:
[Chemical Formula 26]

[Chemical formula 26]

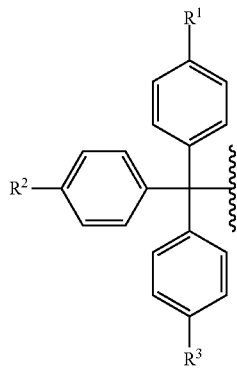

wherein $R^1$, $R^2$, and $R^3$ are identical to or different from each other and each represents hydrogen or an alkoxy group.

It is preferable that one of $R^1$, $R^2$, and $R^3$ is a hydrogen and the remaining two thereof are an alkoxy group, and examples of the alkoxy group particularly preferably include a methoxy group.

Any groups can be used as $G^2$ without particular limitations when they may function as a protecting group, and publicly known protecting groups used for an amidite compound can widely be used. Examples of $G^2$ include a hydrogen atom, an alkyl group, an alkenyl group, an alkynyl group, a cycloalkyl group, a haloalkyl group, an aryl group, a heteroaryl group, an arylalkyl group, a cycloalkenyl group, a cycloalkylalkyl group, a cyclylalkyl group, a hydroxyalkyl group, an aminoalkyl group, an alkoxyalkyl group, a heterocyclylalkenyl group, a heterocyclylalkyl group, a heteroarylalkyl group, a silyl group, a silyloxyalkyl group, a mono-, di-, or tri-alkylsilyl group, a mono-, di-, or tri-alkylsilyloxyalkyl group, and others, and these may be substituted with one or more electron withdrawing groups.

$G^2$ is preferably an alkyl group substituted with an electron withdrawing group. Examples of the electron withdrawing groups include a cyano group, a nitro group, an alkylsulfonyl group, halogen, an arylsulfonyl group, a trihalomethyl group, a trialkylamino group, and others, preferably a cyano group.

$G^2$ is particularly preferably the following group:
[Chemical Formula 27]

[Chemical formula 27]

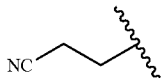

With respect to $G^3$, two $G^3$ may be bonded to each other to form a cyclic structure. Both $G^3$ groups are preferably isopropyl groups.

An alkyl group may be a straight or branched group, and is preferably an alkyl group having 1 to 12 carbon atoms, and more preferably an alkyl group having 1 to 6 carbon atoms. Examples of the alkyl group include methyl, ethyl, n-propyl, isopropyl, n-butyl, isobutyl, tert-butyl, n-pentyl, isopentyl, and hexyl. The alkyl group used herein also includes an alkyl moiety such as an alkoxy group.

$R^a$ is preferably methyl. n is preferably an integer of 1 to 4, more preferably an integer of 1 to 3, still more preferably 1 or 2, and particularly preferably 1.

Also, the amidite compound of the present invention can be used in a free state or a salt state. A Salt of the amidite compound of the present invention is not particularly limited, and includes, for example, a salt with an inorganic base such as a sodium salt, a magnesium salt, a potassium salt, a calcium salt, and an aluminum salt; a salt with an organic base such as a methylamine, an ethylamine, and an ethanolamine; a salt with a basic amino acid such as lysine, ornithine, and arginine; and an ammonium salt. The salt may be an acid addition salt, and specific examples of the salt include a mineral acid such as a hydrochloric acid, a hydrobromic acid, a hydroiodic acid, a sulfuric acid, a nitric acid, and a phosphoric acid; an organic acid such as a formic acid, an acetic acid, a propionic acid, an oxalic acid, a malonic acid, a malic acid, a tartaric acid, a fumaric acid, a succinic acid, a lactic acid, a maleic acid, a citric acid, a methanesulfonic acid, a trifluoromethanesulfonic acid, and an ethanesulfonic acid; and an acid addition salt with an acidic amino acid such as an aspartic acid and a glutamic acid. The amidite compound of the present invention also includes a salt, a hydrate, a solvate, a crystal polymorph, and others.

The amidite compound of the present invention can be produced according to a publicly known method such as those described in JP 5157168 B2, JP 5554881 B2, and the like or the methods described in Examples below, or by a method with appropriate modifications added to these methods as needed.

Also, specific examples of the amidite compound of the present invention include the following compound described in Examples.

[Chemical Formula 28]

[Chemical formula 28]

TPM-Amidite-U

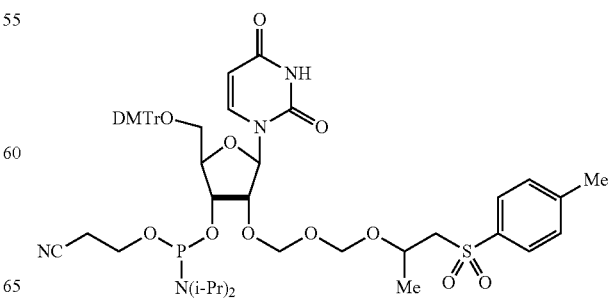

The present invention includes a glycoside compound represented by the following formula (10):
[Chemical Formula 29]

[Chemical formula 29]

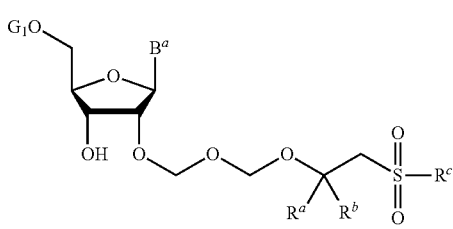
(10)

wherein the groups are as defined above.

Also, the specific examples of the glycoside compound of the present invention include the following compound described in Examples.
[Chemical Formula 30]

[Chemical formula 30]

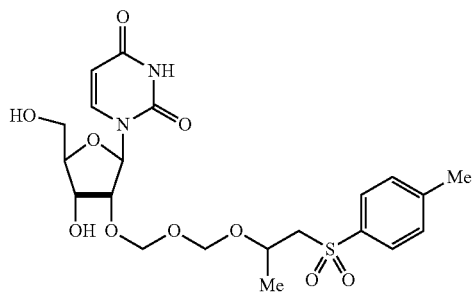

TPM-U-3

The present invention also includes a production intermediate compound for the glycoside compound represented by formula (10). Examples of the intermediate compound include an ether compound represented by formula (4):

[Chemical formula 31]

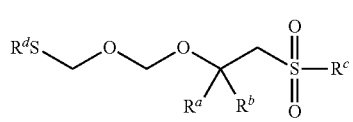
(4)

wherein:
$R^a$ and $R^b$ are identical to or different from each other and each represents a methyl group, an ethyl group, or a hydrogen atom, provided that $R^a$ and $R^b$ do not represent a hydrogen atom at the same time;
$R^c$ represents a phenyl group which may be substituted with a halogen atom, a methyl group, a nitro group, a methoxy group, or a trifluoromethyl group; and $R^d$ represents C1 to C10 alkyl or a phenyl group; a C1 to C10 alkyl group; or a benzyl group.

The ether compound represented by formula (4) can be produced by reacting a bisthioether compound represented by formula (12) (for example, bis(alkylthiomethyl)ether or bis(phenylthiomethyl)ether) with 3-hydroxy-3-alkylpropanesulfone in a solvent in the presence of a halogenating agent and an acid as shown in the following reaction formula.
[Chemical Formula 32]

[Chemical formula 32]

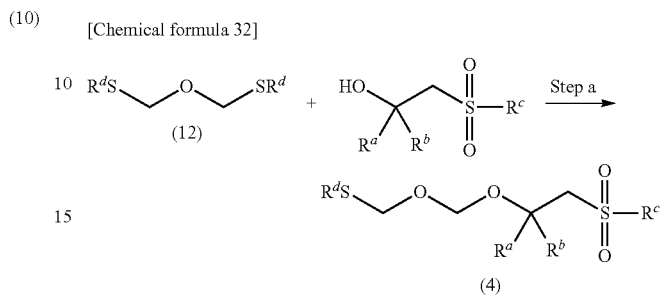

The bisthioether compound of formula (12) can be obtained, for example, by reacting a bischloromethylether or a bis(aryloxymethyl)ether with a corresponding alkyl mercaptan or phenyl mercaptan as shown in the following formula. Examples of the bis(aryloxymethyl)ether include a bis(2,4,6-trichlorophenyloxymethyl)ether.
[Chemical Formula 33]

[Chemical formula 33]

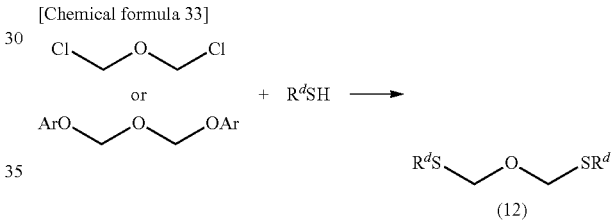

The bisthioether compound of formula (12) can also be produced according to a publicly known production method, for example, the method described in JP 6459852 B2.

Step a of producing a compound of formula (6) as one example of the ether compound of formula (4) will be explained.

Step a will be explained below.

Examples of the halogenating agent include an N-halogenated succinimide such as an N-chlorosuccinimide, an N-bromosuccinimide, and an N-iodosuccinimide, an N-halogenated hydantoin such as a 1,3-diiodo-5,5-dimethylhydantoin, a halogen such as chlorine, bromine, and iodine, and the like as well as a combination of two or more thereof. In the present invention, an N-halogenated succinimide is preferably used, and an N-iodosuccinimide is more preferably used.

An acid is not particularly limited, and includes, for example, a perfluoroalkyl carboxylic acid and a salt thereof, a perfluoroalkyl sulfonic acid and a salt thereof, and an alkyl sulfonic acid and a salt thereof as well as a combination of two or more thereof. Examples of a salt include for example, a copper salt and a silver salt. Specific examples of the acid include a methanesulfonic acid, a para-toluenesulfonic acid, a camphorsulfonic acid, a trifluoromethanesulfonic acid, a silver trifluoromethanesulfonate as well as a combination of two or more thereof. In the present invention, a trifluoromethanesulfonic acid is preferably used.

Examples of a solvent include a tetrahydrofuran, a 2-methyltetrahydrofuran, a cyclopentyl methyl ether, a dioxane, a dichloromethane, a toluene, and the like as well as a combination of two or more thereof. In the present invention, a tetrahydrofuran is preferably used.

The amount of the 2-hydroxyalkylsulfone of formula (5) is usually 0.5 to 2.0 equivalents and preferably 0.8 to 1.5 equivalents relative to the bisthioether compound of formula (12). The amount of the halogenating agent is usually 0.5 to 2 equivalents and preferably 0.7 to 1.2 equivalents relative to the compound of formula (12). The amount of the acid is usually 0.001 to 2.0 equivalents and preferably 0.01 to 0.1 equivalents relative to the compound of formula (12).

The reaction temperature of this reaction is usually −80° C. to 0° C. and preferably −50° C. to −30° C. The reaction time of this reaction is usually 1 to 24 hours and preferably 2 to 6 hours.

The completion of the reaction can be confirmed, for example, by sampling and analyzing a part of a reaction mass by an analysis method such as GC, TLC, and LC. After the completion of the reaction, a base such as a triethylamine may be added to the reaction mass to stop the reaction. A residue containing the ether compound represented by formula (4) can be obtained by adding the reaction mass to water and subjecting the reaction mass to usual post-treatment operations such as organic solvent extraction, washing, and concentration. The ether compound represented by formula (4) with a high-purity can be obtained by subjecting the residue to a purification operation such as distillation and column chromatography.

In the above embodiment, a preferred compound is one represented by formula (6):

[Chemical Formula 34]

[Chemical formula 34]

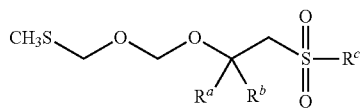

(6)

wherein $R^a$ represents a methyl group or an ethyl group, $R^b$ represents a hydrogen atom, and $R^c$ represents a phenyl group or a tolyl group, and more preferably, $R^a$ is a methyl group, $R^b$ is a hydrogen atom, and $R^c$ is a tolyl group.

The amidite compound of the present invention can be used as a material for producing RNA in the solid-phase synthesis. RNA with a high purity can produced by using the amidite compound of the present invention in the solid-phase synthesis.

A production method for a compound containing a polynucleotide structure represented by the following formula (2) of the present invention includes a step of performing a solid-phase synthesis reaction using the amidite compound:

[Chemical Formula 35]

[Chemical formula 35]

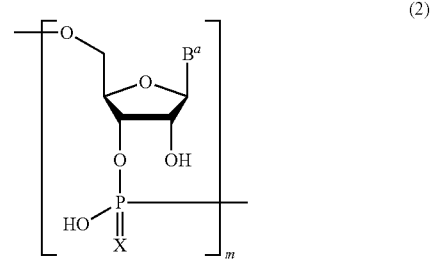

(2)

wherein $B^a$ is identical to or different from each other and each represents a group having an optionally-protected nucleobase structure, X represents an oxygen atom or a sulfur atom, and m represents a positive integer.

Further, the production method of the present invention can also include a step of treating a compound having an oligonucleotide structure represented by formula (3) with a tetraalkylammonium fluoride to obtain the compound having an oligonucleotide structure represented by formula (2):

[Chemical formula 36]

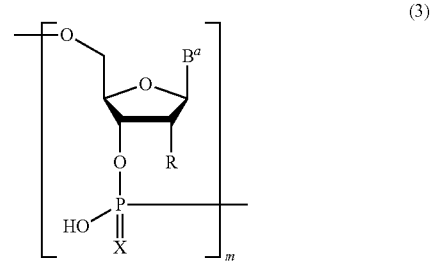

(3)

wherein $B^a$ is identical to or different from each other and each represents a group having an optionally-protected nucleobase structure, X represents an oxygen atom or a sulfur atom, and R is identical to or different from each other and each represents a formula:

[Chemical formula 37]

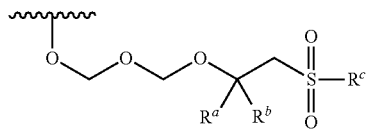

wherein:

$R^a$ and $R^b$ are identical to or different from each other and each represents a methyl group, an ethyl group, or a hydrogen atom, provided that $R^a$ and $R^b$ do not represent a hydrogen atom at the same time;

$R^c$ represents a phenyl group which may be substituted with a halogen atom, a methyl group, a nitro group, a methoxy group or a trifluoromethyl group; a C1 to C10 alkyl group; or a benzyl group.

$B^a$ and m in formulae (2) and (3) are the same as those in formula (1).

m is not particularly limited, and is preferably an integer of 2 to 300.

In the present invention, the "compound containing a polynucleotide structure" means a compound having at least one RNA, preferably a compound consisting of only RNA.

The solid-phase synthesis reaction can be conducted according to a publicly known method such as the phosphoramidite method (for example, the methods described in JP 5157168 B2 and JP 5554881 B2). Also, the solid-phase synthesis reaction can be conducted with a commercially available automatic synthesis device for a nucleic acid and others.

The production method for the compound containing a polynucleotide structure represented by formula (2) specifically includes steps such as (A) a step of deprotecting a hydroxyl group at the 5' position of a first amidite compound supported on a solid support (for example, $G^1$ in formula (1)); (B) a step of condensing the deprotected amidite compound formed in step (A) with a second amidite compound; (C) an optional step of capping a hydroxyl group at the 5' position of an unreacted compound in step (B); (D) a step of converting a phosphorus acid group of the condensate formed in (B) or (C) into a phosphate group or a thiophosphate group; (E) a step of cutting the compound obtained in step (D) from the solid support and deprotecting a hydroxyl groups at the 2' position and a nucleobase; and (F) a step of deprotecting the hydroxyl group at the 5' position. Steps (A) to (D) are repeated to produce a compound containing a polynucleotide structure having a desired chain length (for example, the compound of formula (3)).

The compound having an oligonucleotide structure represented by formula (3) can preferably be treated with a tetraalkylammonium fluoride to eliminate a protecting group at the 2' position, and to produce the compound having an oligonucleotide structure represented by formula (2). The conditions according to publicly known methods can be adopted into the reaction conditions for the reaction (the reaction temperature, the reaction time, the amount of a reagent, etc.).

The compound having an oligonucleotide structure represented by formula (2), obtained by the production method of the present invention may be isolated and purified as needed. Usually, isolation can be performed by using a method of precipitating, extracting, and purifying RNA. Specifically, the following methods are adopted: a method of precipitating RNA by adding a solvent having low solubility in RNA, such as an ethanol and an isopropyl alcohol, to a solution after the reaction; and a method of adding a solution of a phenol/chloroform/isoamyl alcohol (for example, phenol/chloroform/isoamyl alcohol=25/24/1) to a reaction solution and extracting RNA into an aqueous layer. Thereafter, isolation and purification can be performed by a publicly known high performance liquid chromatography (HPLC) method such as reverse-phase column chromatography, anion-exchange column chromatography, and affinity column chromatography, or the like.

RNA can be produced with a higher purity in the production method of the present invention than that in a conventional one.

The reaction conditions are not particularly limited for producing the amidite compound of the present invention represented by formula (1), the glycoside compound of the present invention of formula (10), and the intermediate ether compound of the present invention represented by formula (4). The intermediate ether compound represented by formula (4) can also be synthesized using a flow reactor.

In order to reduce impurities contained in the amidite compound of the present invention, a reduction step with hydrogen or a reduction step with magnesium or the like can be added in the presence of a transition metal catalyst such as palladium.

The 2-hydroxyalkylsulfone represented by formula (5) can also be synthesized via the following production route with reference to the following Documents 1 to 6.

Document 1 CHINESE JOURNAL OF CHEMISTRY 2003, 21, 917
Document 2 SYNTHESIS 2012, 44, 3623
Document 3 Chem. Commun., 2005, 5904
Document 4 New J. Chem., 2009, 33, 972 (baker's yeast)
Document 4 Adv. Synth. Catal. 2013, 355, 2860 ($NaBH_4$ reduction)
Document 4 WO 2017/223414 A1 (catalytic hydrogenation)
Document 5 Tetrahedron Asymmetry 2005, 16, 2157
Document 6 JP 6448867 B2 (mCPBA)
Document 6 Tetrahedron 2001, 57, 2469 (hydrogen peroxide, tungsten)
[Chemical Formula 38]

[Chemical formula 38]

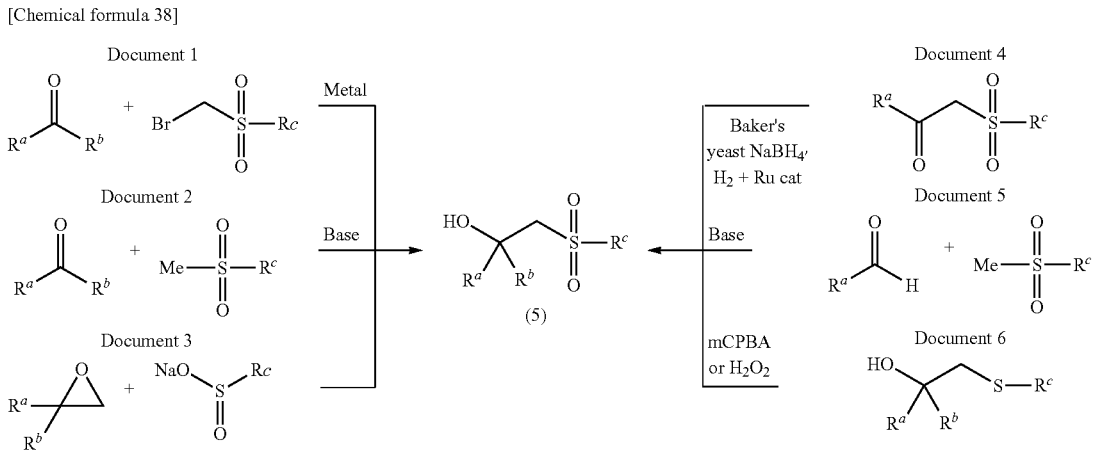

The compound of formula (1) can be produced from a compound of formula (7) in the following steps 1, 2, 3, and 4 of scheme 1.

In the compound of formula (7), $B^a$ represents the same as described above, and $G^4$ typically has the following $G^4$-1 or $G^4$-2 structure.

[Chemical Formula 39]

[Chemical formula 39]

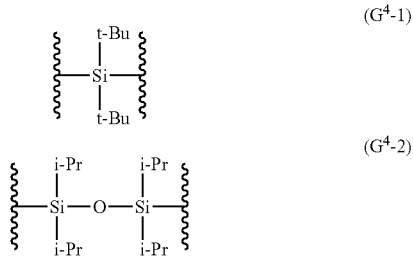

(G⁴-1)

(G⁴-2)

These compounds can be purchased as commercial products, or can be produced, for example, by the method described in Tetrahedron Letters, 2005, 46, 2961.

Step 1 (Etherification Step)

The etherification step is carried out by reacting the compound of formula (7) with the compound of formula (4). This reaction is usually carried out by adding a halogenating agent. The halogenating agent used in this step is not particularly limited, and is preferably at least one selected from the group consisting of an N-chlorosuccinimide, an N-bromosuccinimide, an N-iodosuccinimide, iodine, a 1,3-diiodo-5,5'-dimethylhydantoin, bromine, and chlorine.

In this step, an acid may be added, and the acid to be used is not particularly limited and is preferably at least one selected from the group consisting of a perfluoroalkyl carboxylic acid, a perfluoroalkylsulfonic acid, an alkyl sulfonic acid, and a salt thereof.

A reaction solvent used in this step is not particularly limited, and examples thereof include an ether such as a diethyl ether, a tetrahydrofuran (THF), a 2-methyltetrahydrofuran, a tetrahydropyran, a 4-methyltetrahydropyran, a dimethoxyethane, a diglyme, a cyclopentyl methyl ether, and a dioxane, or a nitrile such as an acetonitrile, an aromatic hydrocarbon such as a toluene, a chlorobenzene, and a dichlorobenzene, a dichloromethane, and the like as well as a combination of two or more of these solvents. Preferred examples of the solvent include an ether such as a diethyl ether, a tetrahydrofuran (THF), a 2-methyltetrahydrofuran, a tetrahydropyran, a 4-methyltetrahydropyran, a dimethoxyethane, a diglyme, a cyclopentyl methyl ether, and a dioxane.

The reaction time in this step is not particularly limited, and is, for example, 10 minutes to 12 hours, preferably 10 minutes to 6 hours.

The reaction temperature in this step is not particularly limited, and is, for example, −80 to 30° C., preferably −60 to 10° C.

The concentration of the ether compound represented by formula (4) in this step is also not particularly limited, and can be set as appropriate.

The number of moles of the ether compound represented by formula (4) in this step is, for example, 0.5 to 2 times, preferably 0.8 to 1.5 times the number of moles of the compound represented by formula (7).

The number of moles of the halogenating agent in this step is, for example, 0.5 to 10 times, preferably 0.8 to 6 times the number of moles of the compound represented by formula (7).

Step 2 (Deprotection Step)

A compound of formula (8) obtained in step 1 is subjected to a deprotection reaction to be converted into a compound of formula (9). The deprotection step can be carried out by a publicly known method, and typically, a hydrogen fluoride/a triethylamine, a hydrogen fluoride/a pyridine, or a triethylamine trihydrofluoride is caused to act in a solvent to perform deprotection.

Step 3 (Protection Step of 5'-hydroxyl Group)

The compound of formula (9) obtained in the above step is subjected to the protection step, and introduction of a protecting group can be carried out by a publicly known method. Typically, a compound (9) is reacted with a 4,4'-dimethoxytrityl chloride in a pyridine to introduce a protecting group, thereby producing a compound (10).

Step 4 (Amidite Step)

This step is carried out by reacting the glycoside compound of formula (10) obtained in the above step with a compound of formula (11). Typically, this step is carried out by reacting a 2-cyanoethyl-N,N,N',N'-tetraisopropylphosphordiamidite as the compound of formula (11) in the presence of diisopropylammonium tetrazolide. The amidite step can be carried out according to the methods described in Examples 2 to 5 of JP 5554881 B2.

[Chemical Formula 40]

Scheme 1

[Chemical formula 40]

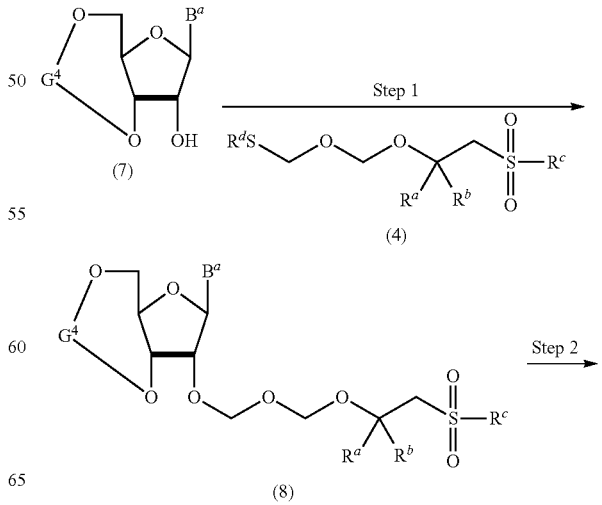

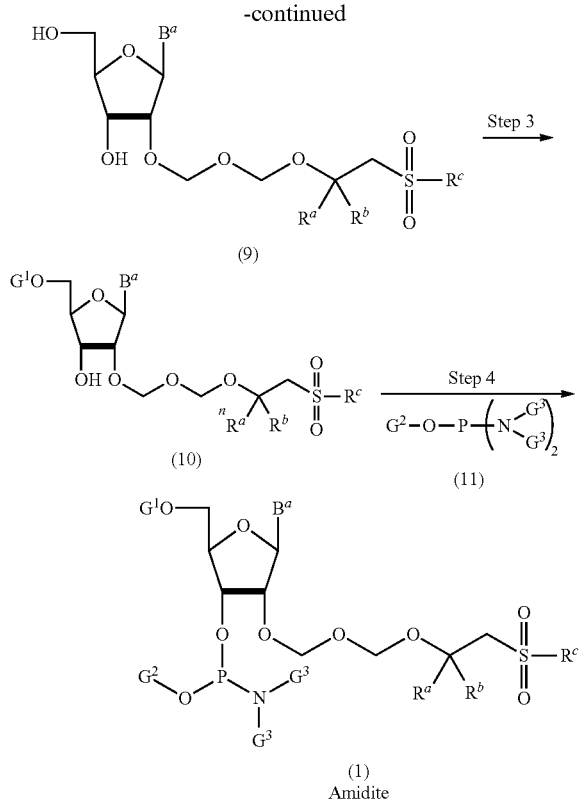

As explained above, the compounds of formulae (7), (8), (9), and (10) can be used in the production of the amidite compound of formula (1).

EXAMPLES

Hereinafter, Examples will be described to explain the present invention in more detail. However, the present invention is not limited to these Examples and so on.

The following abbreviations are used herein.

TPM=(1-(4-methylbenzenesulfonyl)propan-2-yl)oxy)methoxy)methyl group; A=adenine, G=guanine, C=cytosine, U=uracil.

Production of TPM Amidite U

Production Example 1

1) Production of TPM Reagent (TPMR)
[Chemical Formula 41]

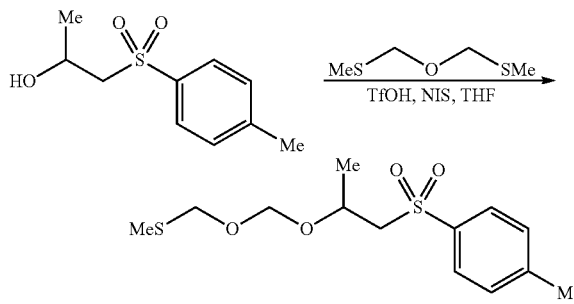

Bis(methylthiomethyl)ether (5.9 g, 0.043 mol) was dissolved in an anhydrous tetrahydrofuran (THF) (60 mL), Molecular Sieves 4A (5.9 g) was added thereto, and the mixture was stirred for 10 minutes. After the mixture was cooled to −50° C., N-iodosuccinimide (NIS) (11.5 g, 1.19 eq.) and then trifluoromethanesulfonic acid (TfOH) (0.11 mL, 0.030 eq.) were added. An acetonitrile (20 mL) solution of 1-(4-methylbenzenesulfonyl)propan-2-ol (10 g, 1.09 eq.) (manufactured by ENAMINE Ltd.) was dropped to the mixture, and the mixture was stirred at −50 to −45° C. for 4 hours. After triethylamine (4.0 mL) was dropped to a reaction solution, the temperature was raised to −30 to −20° C., and then the reaction solution was added to a solution including a sodium thiosulfate pentahydrate (17.1 g), a sodium hydrogen carbonate (6.0 g), and water (130 mL) which had been pre-cooled to 5 to 10° C. in an ice bath. Ethyl acetate (42 mL) was added to the mixture, and the mixture was stirred at 10 to 15° C. for 30 minutes, and then was filtered through celite (5.9 g). A filtrate was separated, and then an organic layer was washed with a 20% brine (24 mL). The organic layer was dried using an anhydrous magnesium sulfate (3 g), and then a solvent was distilled off under reduced pressure (bath temperature: 40° C.). A residue was purified by silica gel chromatography (hexane/ethyl acetate=3/1, silica gel 207 mL) to obtain 3.1 g of yellow oily matter.

As a result of purity analysis by GC/FID, the purity was 91%.

The purification was performed by silica gel chromatography again (hexane/ethyl acetate=8/1, silica gel 150 mL) to obtain 3.1 g of TPMR with a purity of 98.2% and 1.5 g of TPMR with a purity of 97.8%. In the subsequent reactions, both were mixed and used.

$^1$H—NMR (CDCl$_3$): δ7.79(d,2H)7.36(d,2H)4.76(s,2H) 4.63(d,2H)4.27(m,1H)3.44(dd, 1H) 3.14 (dd, 1H) 2.45 (s, 3H) 2.13 (s, 3H) 1.32 (d, 3H)

Production Example 2

2) Production of TPM-U-2
[Chemical Formula 42]

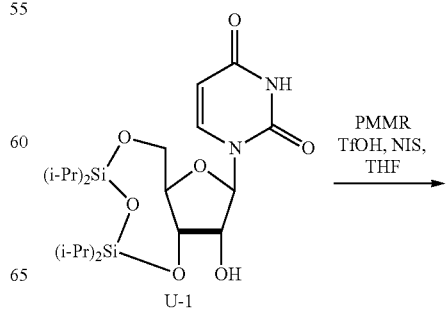

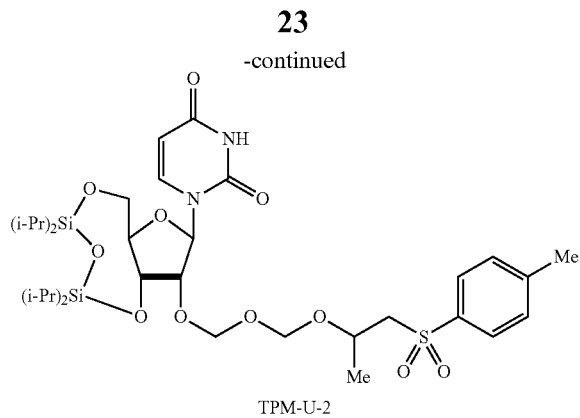

TPM-U-2

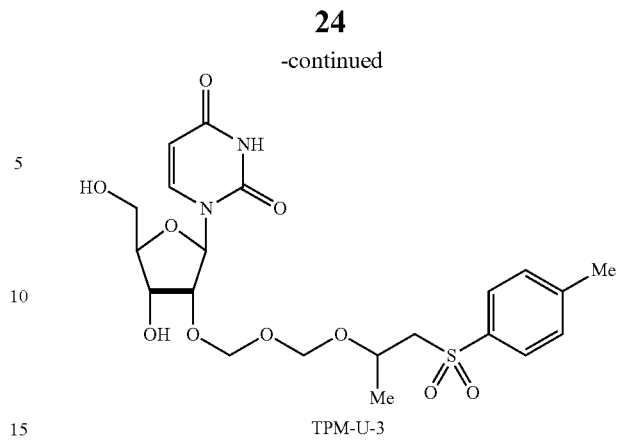

TPM-U-3

Anhydrous toluene (16.5 mL, 5 vol/wt) was added to U-1 (3.3 g, 6.78 mmol), the mixture was concentrated under reduced pressure to 3 vol/wt, anhydrous toluene (6.6 mL, 2.0 vol/wt) was further added thereto, and the mixture was concentrated under reduced pressure to 3 vol/wt. Anhydrous tetrahydrofuran (6.6 mL, 2.0 vol/wt) was added, the mixture was cooled to around −55° C., then PMMR (3.09 g, 10.17 mmol, 1.5 eq.) was dropped thereto, and the mixture was washed with 2 mL of THF. NIS (2.06 g, 9.15 mmol, 1.35 eq.) was added to the mixture, and TfOH (0.72 mL, 8.14 mmol, 1.2 eq.) was dropped at −55 to −45° C. The mixture was stirred at −55 to −45° C. for 1 hour, and the reaction solution was added to a mixed liquid including a sodium thiosulfate pentahydrate (3.3 g), a sodium hydrogen carbonate (1.12 g), water (22 mL), and a toluene which had been cooled in an ice bath. The mixture was stirred in the ice bath for 30 minutes and separated. A solution including a sodium thiosulfate pentahydrate (1.65 g), a sodium hydrogen carbonate (0.6 g), and water (11 mL) was added to an organic layer, and the mixture was stirred at room temperature for 15 minutes and then separated. The organic layer was dried with a sodium sulfate (1 g) and then concentrated to dryness under reduced pressure. A residue was purified by silica gel column chromatography (hexane/ethyl acetate=3/1, silica gel 250 mL) to obtain colorless clear glassy solid TPM-U-2 (5.3 g).

Production Example 3

3) Production of TPM-U-3
[Chemical Formula 43]

[Chemical formula 43]

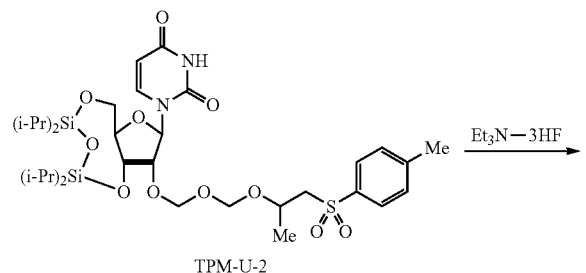

After TPM-U-2 (5.3 g, 7.13 mmol) was dissolved in an acetone (10 mL), triethylamine hydrotrifluoride (1.3 mL, 7.84 mmol) was added, and the mixture was stirred at room temperature for 2 hours. Methyl tert-butyl ether (MTBE) (53 mL) was added to the reaction solution, the mixture was stirred for 30 minutes, and then a MTBE layer was removed by decantation. This procedure was repeated 3 times, and then the residue was dried and solidified under reduced pressure to obtain white amorphous TPM-U-3 (3.5 g).

Production Example 4

4) Production of TPM-U-4
[Chemical Formula 44]

[Chemical formula 44]

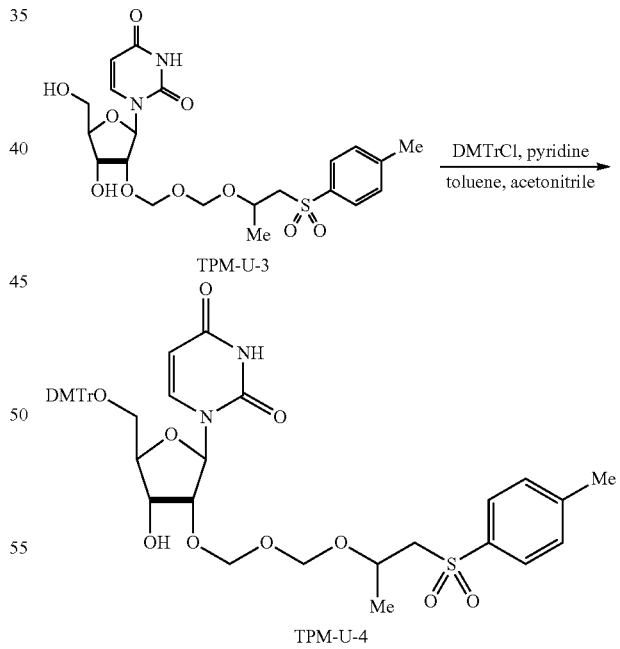

Pyridine (10.5 mL, 3 vol/wt) was added to TPM-U-3 (3.5 g, 7.00 mmol), azeotropic dehydration was conducted twice, then pyridine (7.0 mL, 2 vol/wt), toluene (17.5 mL, 5 vol/wt), and acetonitrile (7.0 mL, 2 vol/wt) were added thereto, and the mixture was cooled to around 0° C. 4,4T-dimethoxytrityl chloride (2.85 g, 8.40 mmol, 1.2 eq.) was added thereto. The mixture was stirred at room temperature for 6 hours, methanol (1.75 mL, 0.5 vol/wt) was added, and the mixture was stirred for 10 minutes. A solution including a sodium hydrogen carbonate (0.53 g) and water (10.5 mL) was added, and the mixture was stirred for 15 minutes and separated (this procedure was further repeated once more). A solution including a sodium chloride (1.05 g) and water (10.5 mL) was added to an organic layer, and the mixture was stirred for 15 minutes and then separated. The organic layer was dried with a sodium sulfate (1 g) and then concentrated under reduced pressure. A residue was purified by silica gel column chromatography (hexane/ethyl acetate=1/1 to ethyl acetate only, silica gel 280 mL) to obtain 3.8 g of white amorphous TPM-U-4 (yield: 670).

Production Example 5

5) Production of TPM-U-5 (TPM Amidite U)
[Chemical Formula 45]

[Chemical formula 45]

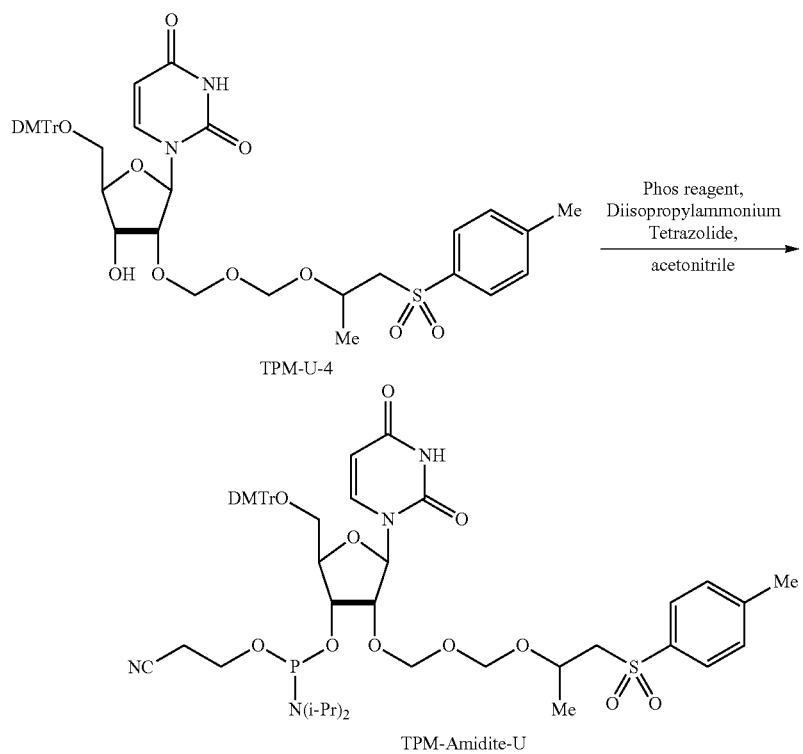

TPM-U-4 (4.7 g, 5.85 mmol) was dissolved in an anhydrous acetonitrile (47 mL, 10 vol/wt), then diisopropylammonium tetrazolide (1.10 g, 6.56=01, 1.12 eq.) and Molecular Sieves 4A (0.94 g, 0.2 wt/wt) were added, and the mixture was stirred at room temperature for 30 minutes. 2-cyanoethyl-N,N,N',N'-tetraisopropylphosphordiamidite (Phos reagent) (2.65 g, 8.78 mmol, 1.5 eq.) was added to the solution, and the mixture was stirred at bath temperature of 45° C. for 1.5 hours. The mixture was cooled to room temperature and filtered, and a filtrate was concentrated under reduced pressure. A residue was purified by silica gel column chromatography (hexane/acetone=2/1+5% pyridine, silica gel 380 mL) to obtain 4.75 g of white solid TPM amidite U.
$^{31}$P—NMR (CDCl$_3$): δ151.89,151.86,150.87

Production Example of Nucleic Acid

Using the TPM amidite U produced in Production Example 5, a uridine 50-mer represented by the sequence of SEQ ID NO: 1 below was synthesized.

(SEQ ID NO: 1)
5'-UUUUUUUUUU UUUUUUUUUU UUUUUUUUUU UUUUUUUUUU
UUUUUUUUUU-3'

(wherein U represents uridine monophosphate sodium salt)

Solid-phase synthesis was performed from the 3' side toward the 5' side using NTS M-4MX-E (manufactured by NIHON TECHNO SERVICE CO., LTD.) as a nucleic acid synthesis device. For the synthesis, porous glass was used as a solid support, a high-purity trichloroacetic acid toluene solution was used as a deblocking solution, 5-benzylmercapto-1H-tetrazole was used as a condensing agent, an iodine solution was used as an oxidizing agent, and a phenoxyacetic acid solution and a N-methylimidazole solution were used as a capping solution.

The purity of an oligonucleotide crude product after the solid-phase synthesis was measured by HPLC. The crude product was separated into each component by HPLC (wavelength 260 nm, column ACQUITY UPLC Oligonucleotide BEH C18, 2.1 mm×100 mm), and the purity of the oligonucleotide was calculated from the obtained area value of a main product relative to the total area value of chromatogram.

Production Example of Nucleic Acid of the Present Invention

Production Example 6

As a result of synthesizing a uridine 50-mer (molecular weight 15246.53) using the TPM amidite U prepared in Example 5, the $OD_{260}$ for 0.173 μmol was 37.21 OD, and the purity was 53.5%. From the $OD_{260}$ value, the yield for 1 μmol was calculated as 8603 μg/μmol.

The results are shown in Table 1 below.

($OD_{260}$ represents an absorbance of UV 260 nm for 10 mm optical path length in an 1 mL solution (pH=7.5). Since RNA is generally known to have 1 OD=40 μg, the production amount of RNA can be calculated from the absorbance.)

Comparative Production Example of Nucleic Acid

Comparative Example 1

Solid-phase synthesis was performed in the same manner as in the method described in Production Example 6 by using the uridine EMM amidite described in Example 2 of JP 5554881 B2 to produce a uridine 50-mer, and as a result, the $OD_{260}$ for 0.228 μmol was 41.41 OD and the purity thereof was 44.1%. From the $OD_{260}$ value, the yield for 1 μmol was calculated as 7264 μg/μmol.

The results are shown in Table 1 below.

TABLE 1

|  | Example 1 | Comparative Example 1 |
| --- | --- | --- |
| Purity of uridine 50-mer (%) | 53.5 | 44.1 |
| Yield (μg/μmol) | 8603 | 7264 |
| Yield (%) | 56.4 | 47.6 |

As shown in Table 1 above, when the amidite produced in the present invention is used, the uridine 50-mer with high purity can be obtained.

INDUSTRIAL APPLICABILITY

The present invention provides a sulfone group-containing ether compound which is useful as a protecting group of a hydroxyl group at the 2' position of an amidite, and an amidite compound having the sulfone group-containing ether moiety. The amidite compound of the present invention is suitable for synthesis of an oligonucleic acid with a high-purity.

FREE TEXT OF SEQUENCE LISTING

SEQ ID NO: 1 in Sequence Listing represents the base sequence of the uridine 50-mer.

The invention claimed is:

1. An amidite compound represented by formula (1):

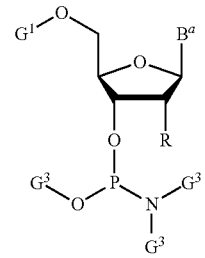

(1)

wherein R represents a group represented by a formula:

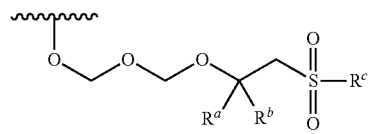

wherein:

$R^a$ and $R^b$ are identical to or different from each other and each represents a methyl group, an ethyl group, or a hydrogen atom, provided that $R^a$ and $R^b$ do not represent a hydrogen atom at the same time; and $R^c$ represents a phenyl group which may be substituted with a halogen atom, a methyl group, a nitro group, a methoxy group, or a trifluoromethyl group; a C1 to C10 alkyl group; or a benzyl group, $B^a$ represents a group having an optionally-protected nucleobase structure, $G^1$ and $G^2$ are identical to or different from each other and each represents a protecting group of a hydroxyl group, and $G^3$ is identical to or different from each other and each represents an alkyl group.

2. The amidite compound according to claim 1, wherein $R^a$ represents a methyl group, and $R^b$ represents a hydrogen atom.

3. The amidite compound according to claim 1, wherein $R^a$ and $R^b$ both represent a methyl group.

4. The amidite compound according to claim 1, wherein $G^1$ represents the following group:

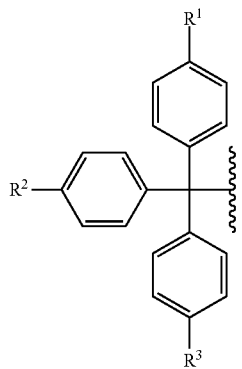

wherein $R^1$, $R^2$, and $R^3$ are identical to or different from each other and each represents hydrogen or an alkoxy group.

5. The amidite compound according to claim 1, wherein $G^2$ represents the following group

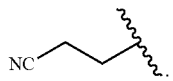

6. The amidite compound according to claim 1, wherein $G^3$ represents an isopropyl group.

7. The amidite compound according to claim 1, wherein $R^c$ represents a phenyl group or a tolyl group.

8. A production method for a compound containing a polynucleotide structure represented by formula (2), the method comprising a step of using the amidite compound according to claim 1 for a solid-phase synthesis reaction:

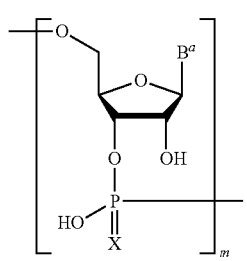

wherein $B^a$ is identical to or different from each other and each represents a group having an optionally-protected nucleobase structure, X represents an oxygen atom or a sulfur atom, and m represents a positive integer.

9. The production method according to claim 8, wherein the compound containing a polynucleotide structure of formula (2) is formed by reacting a compound having an oligonucleotide structure represented by formula (3), formed in the solid-phase synthesis reaction using the amidite compound, with a tetraalkylammonium fluoride:

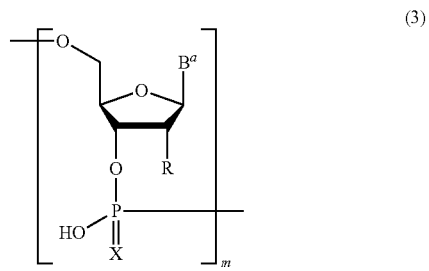

wherein $B^a$, X, and m are as defined in claim 8, and

R is identical to or different from each other and each represents a group represented by a formula:

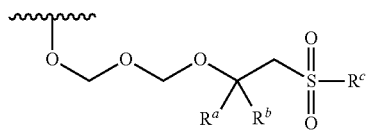

wherein:

$R^a$ and $R^b$ are identical to or different from each other and each represents a methyl group, an ethyl group, or a hydrogen atom, provided that $R^a$ and $R^b$ do not represent a hydrogen atom at the same time; and $R^c$ represents a phenyl group which may be substituted with a halogen atom, a methyl group, a nitro group, a methoxy group, or a trifluoromethyl group; a C1 to C10 alkyl group; or a benzyl group.

10. The production method according to claim 9, wherein $R^a$ represents a methyl group, and $R^b$ represents a hydrogen atom.

11. An ether compound represented by formula (4):

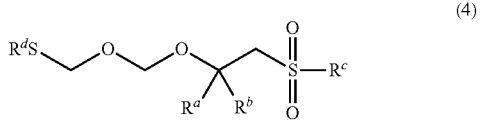

wherein:

$R^a$ and $R^b$ are identical to or different from each other and each represents a methyl group, an ethyl group, or a hydrogen atom, provided that $R^a$ and $R^b$ do not represent a hydrogen atom at the same time;

$R^c$ represents a phenyl group which may be substituted with a halogen atom, a methyl group, a nitro group, a methoxy group, or a trifluoromethyl group; a C1 to C10 alkyl group; or a benzyl group; and $R^d$ represents C1 to C10 alkyl or a phenyl group.

12. The ether compound according to claim 11, wherein $R^a$ represents a methyl group, $R^b$ represents a hydrogen atom, and $R^c$ represents a phenyl group or a tolyl group.

13. A production method for an ether compound represented by formula (4), the method comprising step a of reacting a 2-hydroxyalkylsulfone represented by formula (5) with a bisthioether compound represented by formula (12) in a solvent in presence of a halogenating agent and an acid:

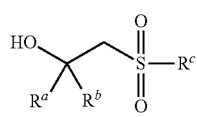
(5)

wherein:

$R^a$ and $R^b$ are identical to or different from each other and each represents a methyl group, an ethyl group, or a hydrogen atom, provided that $R^a$ and $R^b$ do not represent a hydrogen atom at the same time; and $R^c$ represents a phenyl group which may be substituted with a halogen atom, a methyl group, a nitro group, a methoxy group, or a trifluoromethyl group; a C1 to C10 alkyl group; or a benzyl group, $(R^dSCH_2)_2O$ (12)

wherein $R^d$ represents C1 to C10 alkyl or a phenyl group,

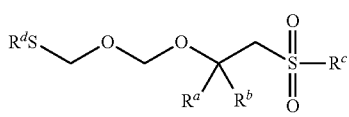
(4)

wherein $R^a$, $R^b$, $R^c$, and $R^d$ are as defined above.

14. The production method according to claim 13, wherein $R^a$ represents a methyl group or an ethyl group, $R^b$ represents a hydrogen atom, and $R^c$ represents a phenyl group or a tolyl group.

15. The production method according to claim 13, wherein $R^a$ represents a methyl group, $R^b$ represents a hydrogen atom, and $R^c$ represents a phenyl group or a tolyl group.

16. A production method for a compound represented by formula (8), the method comprising reacting a compound represented by formula (7) with a compound represented by formula (4) in presence of a halogenating agent:

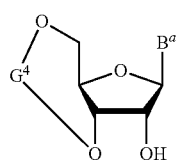
(7)

wherein $B^a$ represents a compound having an optionally-protected nucleobase structure, and $G^4$ represents a protecting group of a hydroxyl group,

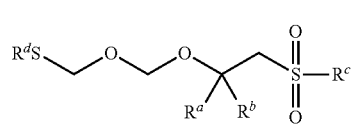
(4)

wherein $R^a$ and $R^b$ are identical to or different from each other and each represents a methyl group, an ethyl group, or a hydrogen atom, provided that $R^a$ and $R^b$ do not represent a hydrogen atom at the same time, $R^c$ represents a phenyl group which may be substituted with a halogen atom, a methyl group, a nitro group, a methoxy group, or a trifluoromethyl group; a C1 to C10 alkyl group; or a benzyl group, and $R^d$ represents C1 to C10 alkyl or a phenyl group,

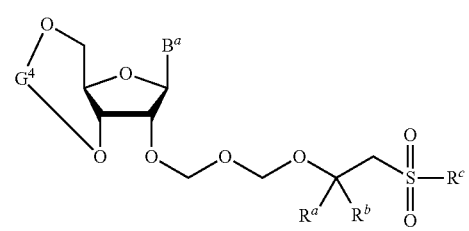
(8)

wherein $B^a$, $R^a$, $R^b$, and $R^c$ are as defined above, and $G^4$ represents a protecting group of a hydroxyl group.

17. The production method according to claim 16, further comprising:

deprotecting the compound of formula (8) to obtain a compound represented by formula (9);

selectively protecting a hydroxyl group at 5' of the compound of formula (9) to obtain a compound represented by formula (10); and reacting the compound of formula (10) with a phosphordiamidite represented by formula (11) to obtain an amidite compound represented by formula (1):

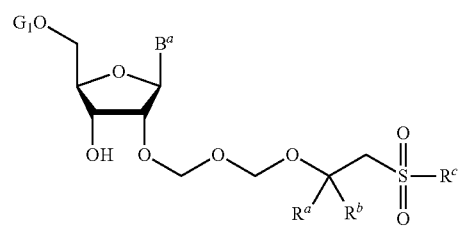
(10)

wherein $B^a$ represents a compound having an optionally-protected nucleobase structure, $R^a$ and $R^b$ are identical to or different from each other and each represents a methyl group, an ethyl group, or a hydrogen atom, provided that $R^a$ and $R^b$ do not represent a hydrogen atom at the same time, $R^c$ represents a phenyl group which may be substituted with a halogen atom, a methyl group, a nitro group, a methoxy group, or a trifluoromethyl group; a C1 to C10 alkyl group; or a benzyl group,

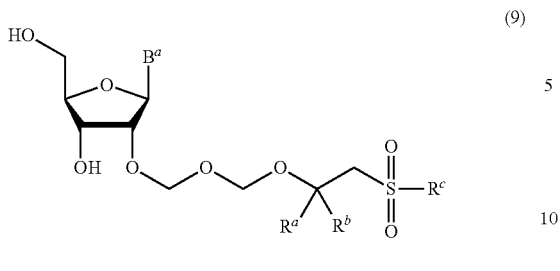

(9)

wherein $B^a$, $R^a$, $R^b$, and $R^c$ are as defined above, and $G^1$ represents a protecting group of a hydroxyl group,

(11)

wherein $G^2$ represents a protecting group of a hydroxyl group, and $G^3$ is identical to or different from each other and each represents an alkyl group,

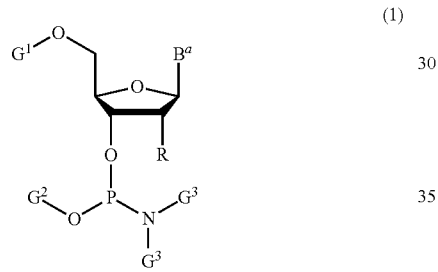

(1)

wherein $B^a$, $G^1$, $G^2$, and $G^3$ are as defined above, and R represents a group represented by a formula:

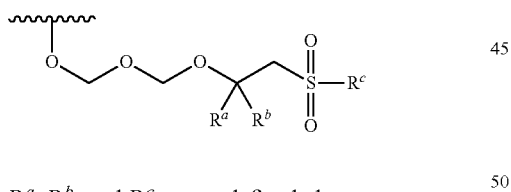

wherein $R^a$, $R^b$, and $R^c$ are as defined above.

18. The production method according to claim 16, wherein $G^4$ has a $G^4$-1 or $G^4$-2 structure:

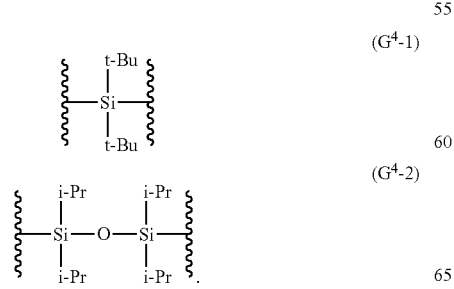

(G$^4$-1)

(G$^4$-2)

19. A compound represented by formula (8):

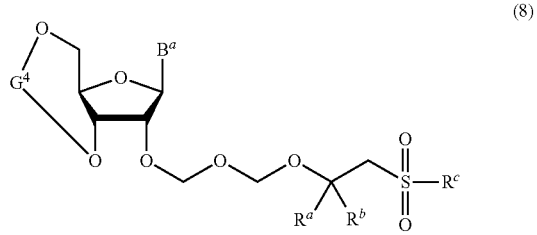

(8)

wherein
$B^a$ represents a compound having an optionally-protected nucleobase structure,
$R^a$ and $R^b$ are identical to or different from each other and each represents a methyl group, an ethyl group, or a hydrogen atom, provided that $R^a$ and $R^b$ do not represent a hydrogen atom at the same time,
$R^c$ represents a phenyl group which may be substituted with a halogen atom, a methyl group, a nitro group, a methoxy group, or a trifluoromethyl group; a C1 to C10 alkyl group; or a benzyl group, and
$G^4$ represents a protecting group of a hydroxyl group.

20. A compound represented by formula (9):

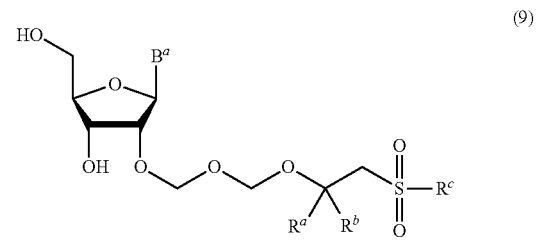

(9)

wherein
$B^a$ represents a compound having an optionally-protected nucleobase structure,
$R^a$ and $R^b$ are identical to or different from each other and each represents a methyl group, an ethyl group, or a hydrogen atom, provided that $R^a$ and $R^b$ do not represent a hydrogen atom at the same time,
$R^c$ represents a phenyl group which may be substituted with a halogen atom, a methyl group, a nitro group, a methoxy group, or a trifluoromethyl group; a C1 to C10 alkyl group; or a benzyl group.

21. A compound represented by formula (10):

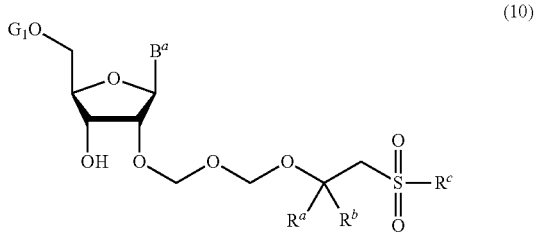

(10)

wherein
$B^a$ represents a compound having an optionally-protected nucleobase structure,
$R^a$ and $R^b$ are identical to or different from each other and each represents a methyl group, an ethyl group, or a hydrogen atom, provided that $R^a$ and $R^b$ do not represent a hydrogen atom at the same time, $R^c$ represents a phenyl group which may be substituted with a halogen atom, a methyl group, a nitro group, a methoxy group, or a trifluoromethyl group; a C1 to C10 alkyl group; or a benzyl group, and $G^1$ represents a protecting group of a hydroxyl group.

* * * * *

```
                        SEQUENCE LISTING

<160> NUMBER OF SEQ ID NOS: 1

<210> SEQ ID NO 1
<211> LENGTH: 50
<212> TYPE: RNA
<213> ORGANISM: Artificial Sequence
<220> FEATURE:
<223> OTHER INFORMATION: uridine 50-mer

<400> SEQUENCE: 1
uuuuuuuuuu uuuuuuuuuu uuuuuuuuuu uuuuuuuuuu uuuuuuuuuu         50
```